July 21, 1936.   C. H. WHITE   2,048,584
IMPLEMENT FRAME
Original Filed Sept. 19, 1927   2 Sheets-Sheet 2
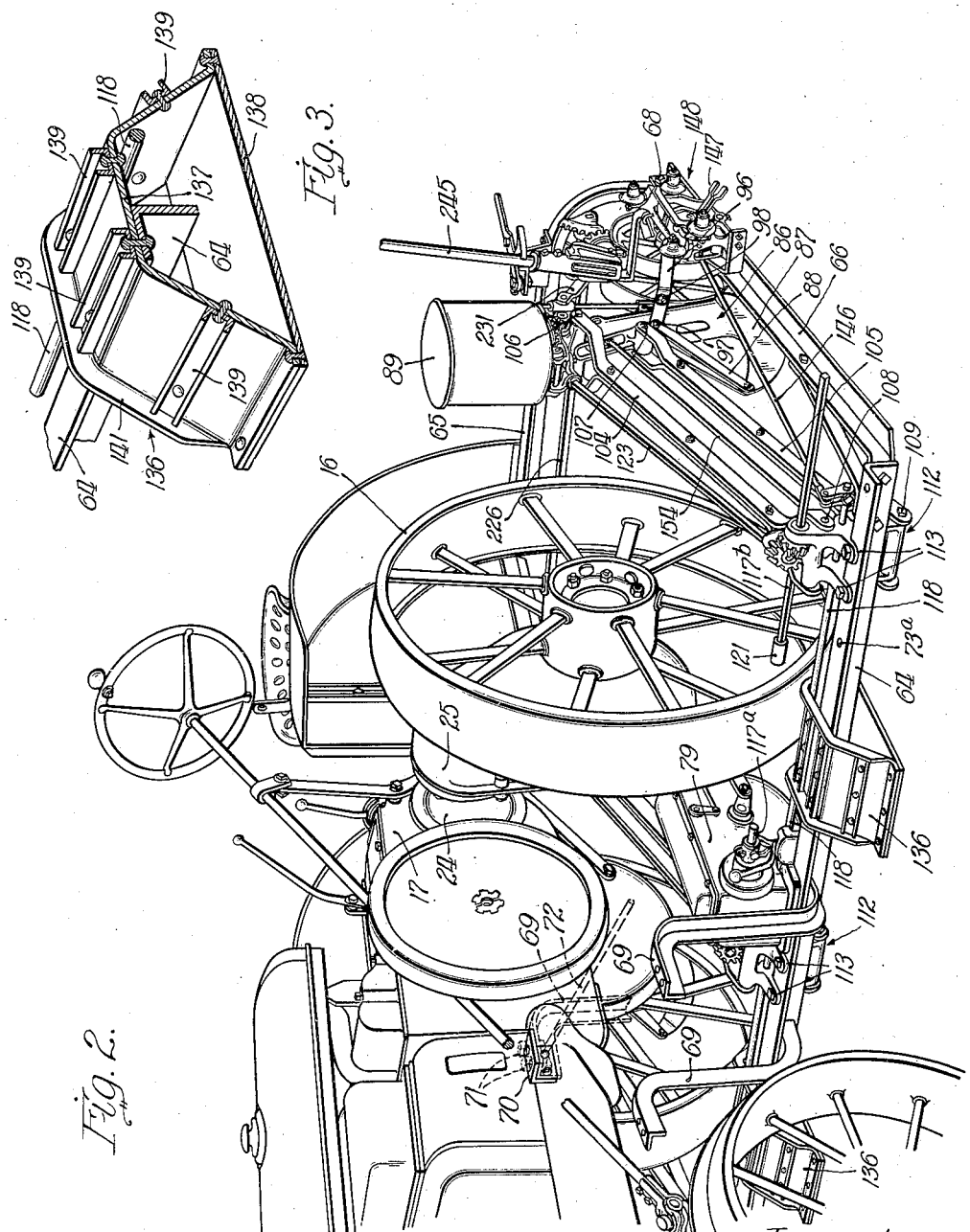
Inventor:
Charles H. White
By: Brown, Jackson, Boettcher & Dienner
Attys.

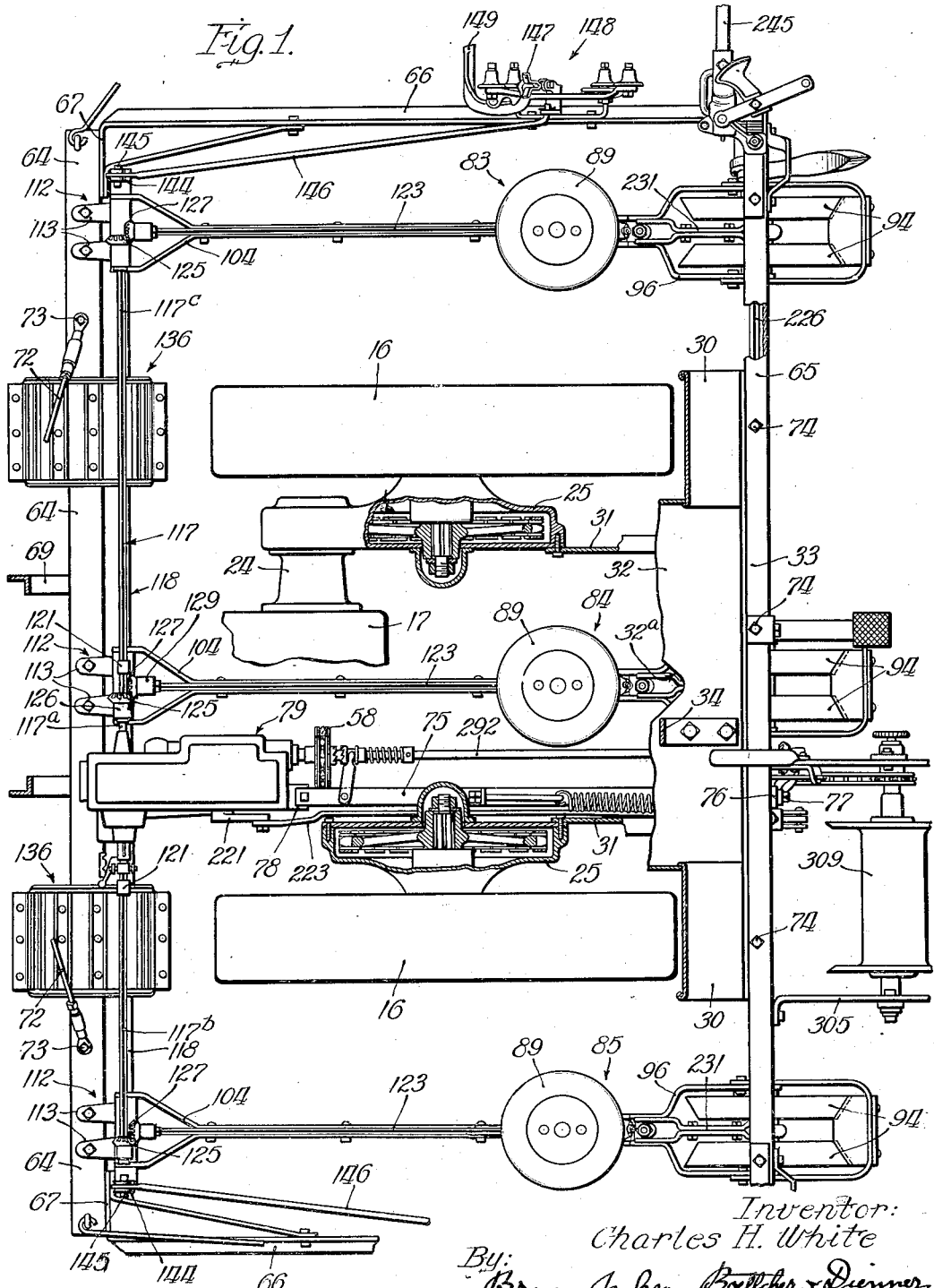

Patented July 21, 1936

UNITED STATES PATENT OFFICE 2,048,584

IMPLEMENT FRAME

Charles H. White, Moline, Ill., assignor to Deere & Company, Moline, Ill., a corporation of Illinois Original application September 19, 1927, Serial No. 220,472, now Patent No. 1,943,778, dated January 16, 1934. Divided and this application January 12, 1934, Serial No. 706,369

11 Claims. (Cl. 97—47)

This is a division of my prior Patent, No. 1,943,778, issued January 16, 1934.

The present invention relates generally to frames for agricultural implements and the like, particularly those of the motor-driven or tractor-propelled type.

One of the principal objects of the invention is to provide an implement which is in the nature of an attachment, adapted for direct mounting in its entirety on a tractor, so that the wheels of the tractor serve as the load sustaining and steering members for the implement.

Another object of the invention, made possible by the foregoing construction, is to shorten the over-all length of the machine, so as to reduce the turning room required at the ends of the field. According to the present construction, the over-all length of the tractor and implement combined is only slightly longer than the over-all length of the tractor itself.

Another object of the invention is to provide an implement frame attachment of the above general description which can be attached to or detached from the tractor in a short length of time. It frequently happens that in order to take advantage of weather and soil conditions, it is desirable to alternate the operations of plowing, harrowing and planting or other operations in the same field or in different fields, and it is hence of great importance to be able to interchange implements in a short length of time. The present machine is so constructed that the implement can be attached to and detached from the tractor through the quick and easy connection and disconnection of only a few parts; and one of the features by which the tractor and implement unit can be readily connected and disconnected is a particular construction and arrangement of the implement parts whereby the tractor wheels can be driven over one end of the implement frame in the attaching and detaching operations.

Numerous other objects of the invention pertaining to the more specific features of construction will be set forth in the following description of a preferred embodiment of the invention.

In the drawings illustrating such embodiment:

Figure 1 is a plan view of a planting implement constructed in accordance with the principles of the present invention, the rear driving wheels of the tractor also being shown to illustrate the relative locations of the implement frame and planter units with respect to the tractor;

Figure 2 is a perspective view, showing how the tractor can be run over portions of the implement frame and associated parts in the operation of attaching the implement to or detaching it from the tractor; and Figure 3 is a perspective view in section, illustrating one of the ramps or bridge members which are carried on the front of the implement frame.

Figure 1 shows the general construction of the implement frame, and for best illustrating the present invention I have shown the implement frame as a part of a planting implement adapted to be attached to the tractor and carrying a number of planting units. I shall first describe such structural features of the tractor as have cooperation with the planting implement, and shall then describe the detailed construction of the implement frame and units associated therewith. The tractor is of a type which is propelled by two rear drive wheels, the latter being designated 16—16. The front end of the tractor is supported on two steering wheels, not shown, which are preferably, although not necessarily, disposed in the longitudinal planes of the tractor wheels 16. The engine is at the forward portion of the tractor, as best shown in Figure 2, and its power is transmitted to the drive wheels through a driving train. The engine crank shaft, the selective speed transmission mechanism and the differential are inclosed in an elongated housing 17 which constitutes the rear portion of the tractor frame. The details of the transmission mechanism and the differential form no part of the present invention.

Extending laterally from each side of the housing 17 are suitable shafts which project outwardly through the side walls of the housing and extend through short lateral housings 24 which are bolted to the sides of the main housing 17. Bolted to the outer ends of these lateral housings are housings 25, which extend downwardly and slightly rearwardly. The latter housings 25 support the rear driving wheels 16 and also enclose the driving chains or other means through which propelling power is transmitted to these rear wheels.

The upper rearward sides of the traction wheels 16 have fenders 30 extending over the same, which fenders are suitably supported on bars 31 extending rearwardly from the wheel-supporting housings 25. A platform 32 extends between the fenders 30, the rear ends of the fenders and of the platform being reinforced by a transverse angle bar 33 which is secured to both. The forward portion of the platform 32 is cut away or left open, as at 32a in Figure 1, to accommodate the seed hopper on the intermediate planter unit. A standard 34 rises from the platform 32 and supports the operator's seat.

I shall now describe the construction of the planting implement, including the manner in which it is mounted on the tractor, although it is to be understood that the present invention is not to be limited to planting implements. Referring to Figure 2, all of the parts of the planting implement are mounted on an open rectangular frame, the long dimension of which extends transversely of the tractor. Such frame comprises a transverse front bar 64, a transverse rear bar 65, and longitudinal side bars 66—66. All of these bars are preferably of angle section, and the front ends of the side bars are secured to the cross bar 64 by bending the vertical flanges of the side bars inwardly and securing the same to the vertical flange of the cross-bar 64, as indicated at 67. The rear bar 65 is disposed in a considerably higher plane than the side bars 66, and in joining such bars together the ends of the rear bar are curved downwardly and bolted to the vertical flanges of the side bars, as indicated at 68 in Figure 2.

The implement frame is adapted to be fixedly secured at its front and rear ends to the tractor. For mounting the front end of the frame on the tractor, two hanger brackets or arms 69 are secured to the front bar 64 of the frame and are bent upwardly and forwardly (Figure 2) for resting on or attachment to brackets 70 which project from each side of the engine bed or tractor frame. The hanger arms 69 may be secured to the brackets 70 by bolts 71 or the like, the arms affording a readily attachable and detachable connection whereby the front end of the implement frame can be easily and quickly connected to or disconnected from the tractor. The dotted line position in Figure 2 of the upper end of one of the hanger arms indicates the relation of these parts when the implement is attached to the tractor. Extending diagonally between the front ends of the hanger arms 69 and the front crossbar 64 of the frame are brace rods 72. The front ends of such rods are adapted to be secured to the lugs or brackets 70 by bolts or the like when the implement frame is attached, preferably by the same bolts 71 which fasten the arms 69, and the rear ends of the rods are secured to the frame bar by bolts 73 (Figure 1) inserted in openings 73a (Figure 2). The rear portion of the implement frame is carried on the angle bar 33 which braces the rear ends of the fenders 30 and platform 32. It will be noted from Figure 1 that the horizontal flange of the rear frame bar 65 extends forwardly, and in the operation of mounting the implement on the tractor this flange is brought to rest on the horizontal flange of the bar 33, the two flanges being detachably connected together by bolts 74.

It will be seen from the foregoing that when the implement is connected to the tractor, it is carried thereon in its entirety. It will also be noted that the front frame bar 64 is disposed in front of the tractor drive wheels and the rear frame bar 65 is disposed in rear of said drive wheels, so that the rectangular outline of the frame encompasses the drive wheels. When it is desired to disconnect the implement frame from the tractor, the bolts securing the arms or brackets 69 to the tractor frame and the bolts 74 are removed, the brace rods 72 are swung out to the sides of the frame, and the front frame bar 64 is dropped down into proximity to the ground, this being the position shown in Figure 2. Thereupon, the tractor wheels can be driven out of the frame across the front frame bar 64. The complete detachment of the implement also requires the disconnection and removal of certain other operating parts, which will be hereinafter described. In a later part of this description, I shall also describe the bridge members or ramps, which extend across the front frame bar 64, and over which the tractor wheels are driven in attaching and detaching the implement.

The intermediate portion of the implement frame is braced longitudinally by an intermediate brace bar 75, the rear end of which inclines upwardly and is bolted to an angularly shaped bracket 76 which is secured to the rear frame bar 65 by a bolt 77 (Figure 1). The front end of the intermediate frame bar 75 is secured to a bracket 78, which projects from the rear end of a housing 79, carried by the implement frame. The front end of said housing has an angular recess formed in its lower edge, which recess rests on the front frame bar 64, this portion of the housing being bolted or otherwise secured to the frame bar 64. The housing 79 encloses the power lift mechanism and the mechanism which derives power from the tractor motor and drives the planter or other implement mechanism.

As stated above, the agricultural implement chosen to illustrate the principles of the present invention is a planter and, as best shown in Figure 1, three planter units 83, 84 and 85 are pivotally mounted for vertical swinging movement in the implement frame between the front and rear frame bars. These planter units are so disposed in the implement frame that the intermediate unit 84 is positioned centrally between the traction wheels 16 of the tractor, and the two lateral units 83 and 85 are positioned outwardly on each side of the traction wheels. As has been heretofore described, when the planting implement is attached to the tractor the front frame bar 64 is disposed forwardly of the drive wheels 16, under the intermediate portion of the tractor, and the rear frame bar 65 is disposed in rear of the drive wheels. By virtue of this relation of the implement frame with respect to the tractor, it will be apparent that the three planter units 83, 84 and 85 can be disposed in the transverse plane of the wheels 16, and approximately in the vertical axial plane of the wheels.

I do not intend to claim in this case any of the planter features and combinations set forth and claimed in my copending application mentioned above, but in order to furnish a clear description of the present invention I will briefly describe some of the planter details. In describing these planter units, I shall only refer to one of the units, as all three are substantially duplicates. Each "planter unit" embraces in its entirety a furrow opener, a seed hopper, a seed feeding or selecting plate, seed dropping valve mechanism, and a covering wheel. All of these parts are carried by a shank 86, which constitutes a main supporting member for the planter unit. The furrow opener is preferably in the form of a runner 87, although a disc type of furrow opener might be employed. The rear end of the runner is secured to the shank 86, and the upwardly curved forward end thereof is braced to the shank by a brace bar 88. The seed hopper 89 is mounted on the upper end of the shank 86, and revolving in the bottom of this seed hopper is a seed feeding or selecting plate, not shown, driven by means which will be referred to later.

The depth of the seed furrow opened by the runner 87 of each planter unit is controlled by a pair of wheels 94 which are disposed in rear of the runner shank 86. Both wheels are mounted side by side on a shaft carried in a yoke 96 (Figure 1), the two side arms of which extend forwardly on opposite sides of the shank 86 and have pivotal mounting on a bolt 97 extending through the front edge of the shank (Figure 2).

A second bolt 98 passes between the arms of the yoke and through a slot formed in a wing or lug projecting rearwardly from the shank, this slot being curved on an arc having the pivot bolt 97 as its center. It will be evident that by loosening the bolt 98, the wheels 94 may be swung upwardly or downwardly so as to engage the ground when the furrow opener has moved down to a greater or lesser penetration. The adjusted setting of the wheels 94 will, therefore, control the depth of the furrow opened by the runner 87.

Each planter unit has pivotal connection with the implement frame through upper and lower parallel links 104 and 105. The rear ends of the links have pivotal connection with the planter unit on vertically spaced pivots 106 and 107, and the front ends of the links have pivotal connection with the frame on vertically spaced pivots 108 and 109. As shown, each link preferably consists of two bars bolted together, with the front ends of the bars separated to form pivot yokes or forks. Such yokes establish widely spaced points of bearing support between the front end of each link and the implement frame, whereby the planter unit is firmly supported against lateral tipping. The above described mounting of each planter unit permits the unit to move upwardly and downwardly relative to the implement frame, thereby enabling the runner 87 to adapt itself to the contour of the ground, under the depth regulating control of the covering wheels 94. The two links and their pivots are so proportioned and arranged that in such up and down movement the unit is held at all times in the same angular relation to the vertical, in contra-distinction to a fore and aft tilting of the planter unit, which would result in cross-checking inaccuracies.

Referring to Figure 2, it will be noted that the front ends of the parallel links have pivotal connection with brackets 112 from which extend arms 113 which are bolted to the upper flange of the front frame bar 64. Each bracket is also secured to the vertical flange of the frame bar. The pivot bolt or bolts 108 for the upper link 104 engage in the upper portion of the bracket, and the pivot bolt or bolts 109 for the lower link engage in an arm depending from the lower portion of the bracket.

Extending transversely across the front end of the implement frame, and rotatably supported in the three brackets 112, are upper and lower shafts 117 and 118. The upper shaft 117 constitutes a driving shaft through which power is transmitted to the three planter units, and the lower shaft 118 constitutes a driving shaft through which operating impulses are transmitted to the seed dropping valve mechanisms in the three units.

The driving shaft 117 is divided into three alined sections, 117a, 117b and 117c disposed coextensively across the frame. The intermediate section 117a extends transversely through the housing 79, having operative connection therein with mechanism which drives the shaft 117 under the control of the shaft 118. The present invention is not concerned with the details per se of this mechanism which is best shown in my copending application mentioned above. The two lateral shaft sections 117b and 117c consist of square shafts adapted to have releasable coupling with the ends of the intermediate section 117a through socket sleeves 121. As best shown in Figure 2, one of these socket sleeves is rigidly secured to the inner end of each lateral shaft section, and the extending end of each sleeve is adapted to be slipped over the adjacent end of the intermediate shaft section 117a, which latter shaft section is round. The sleeves are releasably coupled to the intermediate shaft section by cotter pins or the like, which also function as shear pins to prevent breakage of the operating parts in the event of jamming of the feed plate mechanism.

The rotation of the shaft 117 is transmitted to the three planter units through individual shafts 123, which have bevel gear connection with the cross shaft 117 and which extends rearwardly to the planter units. Figure 1 illustrates the driving relation between the cross shaft 117 and the rearwardly extending shaft 123 of the intermediate planter unit. The shaft section 117a extends through the hub of a bevel gear 125, having keyed or pinned engagement therewith to drive the gear. The hub has bearing support in a bearing boss 126 extending upwardly from the bracket 112. The bevel gear 125 meshes with a bevel gear 127 which has a relatively long bearing hub journaled in a boss 129 that also extends upwardly from the bracket 112. The rear end of such shaft has operative connection with the planter unit for driving the seed selecting plate, and it will hence be seen that such end of the shaft must be capable of vertical swinging movement with the rise and fall of the planter unit. Such swinging movement is accommodated by a universal joint connection between the front end of the shaft 123 and its driving gear 127. The shaft is capable of a limited endwise movement within the socket, to accommodate any slight shifting of the shaft which may be incident to the vertical movement of the planter unit. The rear end of the shaft 123 has suitable support in a bearing carried by the runner shank 86.

It will thus be seen that rotation of the shaft 117a is operative to drive the seed selecting plate of the planter unit irrespective of the furrow opening depth adjustment of the unit, or of its rise and fall in passing over uneven ground. The seed selecting plates of the two lateral planter units 83 and 85 are driven through a substantially identical arrangement of bevel gears mounted on the two laterally disposed brackets 112. The outer ends of the two shaft sections 117b and 117c extend into square sockets formed in the bearing hubs of the two outer bevel gears 125 so that these lateral shaft sections can be slid outwardly through the gears to release their inner sleeve ends 121 from the ends of the intermediate shaft section 117a. This is for the purpose of removing the two outer shaft sections 117b and 117c from the path of the tractor wheels 16 when the wheels are to be driven across the front end of the frame, in attaching and detaching the planting implement as illustrated in Figure 2. After the tractor wheels have been driven over the frame bar 64, the shaft sections 117b and 117c are slid inwardly through their respective bevel gears and their sleeve ends 121 are recoupled to the ends of the intermediate shaft section 117a by replacing the cotter pins.

To facilitate driving the tractor wheels forwardly or backwardly across the front frame bar 64 when attaching or detaching the implement, bridge members or ramps 136 are secured to such frame bar at points spaced correspondingly to the tread of the tractor wheels. One of such bridge members or ramps is illustrated in section in Figure 3. It will be noted that it comprises an arched plate 137 having flanged ends secured to a flat plate 138. The frame bar 64 extends transversely through the arch of each of these ramps, being suitably secured to the underside of the high portion of the arch.

The flat plate 138 is adapted to rest upon the ground and it will hence be seen that when driving the tractor wheels over the ramp, the weight of the rear portion of the tractor is transmitted through the plates 137 and 138 directly to the ground and that no portion of such weight is borne by the bar 64 or any other portion of the implement frame. Channel bars 139 extend transversely of the arched plate 137 to reinforce the same and to provide traction surfaces, enabling the tractor wheels to travel up the inclined ends of the ramp. While the drawings do not show the drive wheels equipped with the usual traction lugs or grousers, it will be understood that under most conditions these lugs will be used. Such lugs or grousers will not injure the ramps 136. The travel of the wheels over the ramps is guided laterally by flanges 141 which are turned upwardly from the ends of the arched plates 137. After the bolts 71 and 74 have been removed and the center seed hopper 89 taken off, the only preparatory steps necessary to be performed before the tractor wheels can be driven over the ramps are the outward shifting of the shaft sections 117b and 117c, as above described, and the shifting of the upper ends of the diagonal brace rods 72 out of the path of the tractor wheels.

It will be noted that the lower shaft 118 extends through the ramps, alongside the frame bar 64, and hence it is not necessary to uncouple or disconnect this shaft preparatory to driving the tractor wheels across the ramps. As before remarked, such shaft has bearing support in bearing bosses carried by the brackets 112, and mounted on the ends of such shaft beyond the outermost brackets 112 are arms 144 which have pivotal connection at 145 with rearwardly extending links 146. The rear ends of such links have pivotal connection with check forks 147 of check heads 148, there being one of these check heads mounted on each side bar 66 substantially in the transverse plane of the three planter units. Any form of check head may be used, so far as the present invention is concerned, but I prefer to employ a check head similar to that shown in my prior Patent No. 1,805,506, issued May 19, 1931, and comprising a tripping or releasing arm 149, which is adapted to be engaged by a large doffing button on the check wire for the purpose of opening the check head, so as to doff the wire at predetermined points adjacent to the ends of the rows. Operation of the check heads 148 rocks the shaft 118, and this motion is transmitted through links 154 (Figure 2) to the seed dropping valve mechanism of the several planting units in a manner similar to that set forth in my prior Patent No. 1,891,488, issued December 20, 1932.

The mechanism which causes the intermittent rotation of the feed shaft 117 is old and well known, and furthermore forms per se no part of the present invention. Hence I shall only describe the same in brief, sufficient to give an understanding of the operating cycle of the machine. The housing 79 includes mechanism driven by sprocket and chain means 58 from the tractor motor and controlled by the rocking of the shaft 118 for intermittently rotating the seed feeding shaft 117, and there is also included mechanism operating through a power lift arm 221 and a link 223 for raising and lowering all of the implement units, reference being had to the aforesaid copending application for particular details. Briefly, however, the link 223 is connected with an arm on a rock shaft 226 which extends transversely of the implement frame and is supported in suitable bearing brackets carried by the rear transverse frame bar 65. The rock shaft preferably carries lift arms 231 the outer end of each of which is connected with the associated planter unit to raise and lower the same. If desired, marker arms 245 at the rear corners of the implement frame may also be raised and lowered by the rock shaft. Further, the implement frame may carry a check wire reel 309, as by a reel frame 305, and power driven means including a drive shaft 292 may be provided for winding the check wire on the reel, all as best shown in my aforesaid copending application.

The seed planting operations will be generally understood by those skilled in the art, and hence I shall only briefly summarize these operations. The engagement of each button on the check wire with one of the check forks 147 will rock such fork, which will transmit rocking motion to the check shaft 118 through the link 146. This shaft will, in turn, transmit motion through the three links 154 to actuate the seed dropping valve mechanisms of all three planter units, whereby the seed is dropped simultaneously into all three seed furrows. Such rocking movement of the shaft 118 also controls the operating mechanism within the housing 79 controlling the seed feeding shaft 117.

When it is desired to disconnect the implement from the tractor, the front and rear ends of the implement frame are released from the tractor by removing the bolts 71 and 74; then the lateral drive shafts 117b—117c, together with the diagonal braces 72, are removed from the path of the tractor wheels, all as previously described. The hopper 89 of the intermediate planter unit is also detached to permit the rear bar 33 of the tractor to clear such planter unit, and the drive chain means 58 is disconnected from the tractor. Thereupon, the tractor drive wheels 16 can be driven out of the implement frame across the ramps 136, the latter protecting the operating shaft 118. The reattachment of the implement to the tractor is merely a reversal of the above operations.

So far as I am aware, I am the first in the art to provide an agricultural implement having frame means which can be easily attached and detached while providing for the support of operating units on the frame. Therefore, the claims hereinafter made are intended to be construed generically, except in so far as they may be directed to particular features of the construction shown and described.

What I claim, therefore, and desire to secure by Letters Patent is:

1. The combination with a tractor having front and rear wheels, of an implement adapted to be attached to and detached from said tractor, comprising frame means having a transverse frame bar adapted to be disposed between said front and rear wheels when the implement is attached to the tractor, an operating unit supported by said frame means, and means providing for the passage of the wheels at one end of said tractor across said transverse frame bar in the attaching or detaching of the implement.

2. The combination with a tractor having front and rear wheels, of an implement adapted to be attached to and detached from said tractor, comprising a frame having an end bar arranged to extend transversely of the tractor between said front and rear wheels when the implement is attached to the tractor, a plurality of operating units disposed in planes spaced laterally of the wheels at one end of the tractor and including parts disposed alongside said wheels, and means whereby the wheels at said one end of said tractor can be driven across one end of said frame to clear said parts and bring the tractor and frame into proper relation for attaching the implement to the tractor.

3. The combination with a tractor, of an implement adapted to be attached to and detached from said tractor, comprising a plurality of implement units, an operating member for said units mounted on the implement, and means carried by the implement and extending in protecting relation over said operating member to permit the wheels of the tractor to be driven over the same in attaching or detaching the implement.

4. The combination with a tractor having front and rear wheels, of an implement adapted to be attached to and detached from said tractor, comprising frame means having a frame bar arranged to extend transversely of the tractor between said front and rear wheels when the implement is attached to the tractor, a plurality of implement units supported by said frame means, and ramp means associated with said transverse frame bar and arranged whereby the wheels at one end of said tractor can be driven across said ramp means in the attaching or detaching of the implement.

5. The combination with a tractor having a pair of wheels at one end thereof, of an implement adapted to be attached to and detached from said tractor, comprising a frame arranged to encompass said tractor wheels when the implement is attached to the tractor, a plurality of implement units mounted on said frame and arranged whereby said tractor wheels can be driven over one end of said frame in the operation of attaching or detaching the implement, and ramp means carried by the latter end of said frame, over which said tractor wheels can be driven.

6. The combination with a tractor having a pair of wheels at one end thereof, of an implement adapted to be attached to and detached from said tractor comprising a frame arranged to encompass the tractor wheels when the implement is attached to the tractor, a plurality of implement units mounted on said frame, and arranged whereby said tractor wheels can be driven over one end of said frame in the operation of attaching or detaching the implement, an operating member for said units extending transversely of said frame adjacent to the latter end thereof, and ramps secured to said frame and extending in protecting relation over said operating member to permit the wheels of the tractor to be driven over the same.

7. The combination with a tractor having front and rear wheels, of an implement adapted to be attached to and detached from said tractor, comprising frame means having a frame bar arranged to extend transversely of the tractor between said front and rear wheels when the implement is attached to the tractor, an operating unit supported by said frame means, an actuating member for said unit carried by said transverse frame bar, and means carried by said transverse frame bar adjacent said actuating member and providing for the movement of the tractor wheels over said transverse frame bar and said actuating member during the operation of attaching or detaching said implement without injury to said frame bar or said member.

8. The combination with a tractor having supporting wheel means and a rear transverse bar, of an implement attachment having a frame comprising a front transverse frame bar adapted to be detachably connected with the tractor forward of said wheel means, a rear transverse frame bar having an intermediate portion adapted to be detachably connected with said first rear transverse bar carried by the tractor, said rear frame bar having downwardly bent ends at each side of the tractor, and longitudinal side frame bars secured to said downwardly bent ends and to the ends of said front transverse frame bar and extending alongside said tractor wheel means, and means carried by said front transverse frame bar providing for the movement of said tractor wheel means over the front transverse frame bar during the operations of attaching said implement to and detaching it from the tractor.

9. The combination with a tractor having front and rear wheels, of an implement adapted to be attached to and detached from said tractor, comprising frame means having a cross bar adapted to be disposed between said front and rear wheels when the implement is attached to the tractor and adapted to rest on the ground when the implement is detached from the tractor, and means whereby the wheels at one end of said tractor can be driven across said cross bar in the attaching or detaching of the implement.

10. The combination with a tractor having front and rear wheels, of an implement adapted to be attached to and detached from said tractor, comprising frame means having a frame bar arranged to extend transversely of the tractor between said front and rear wheels when the implement is attached to the tractor, and ramp means associated with said transverse frame bar and arranged whereby the wheels at one end of said tractor can be driven across said ramp means in the attaching or detaching of the implement.

11. The combination with a tractor having front and rear wheels, of an implement adapted to be attached to and detached from said tractor, comprising frame means having side members adapted to be disposed outside of the path of the wheels of the tractor, and a cross bar connected with the forward ends of said side members and adapted to be disposed between said front and rear wheels and across and in close proximity to said rear wheels when the implement is attached to the tractor, said side members being connected with the cross bar at points outside of the path of the wheels of the tractor, and means detachably securing said frame means to the tractor, the portions of said cross bar extending across the tread lines of said wheels being disposed at substantially right angles with respect thereto to facilitate the movement of the wheels over the cross bar when the forward ends of the side members are on the ground in attaching and detaching the implement.

CHARLES H. WHITE.